Patented Sept. 29, 1925.

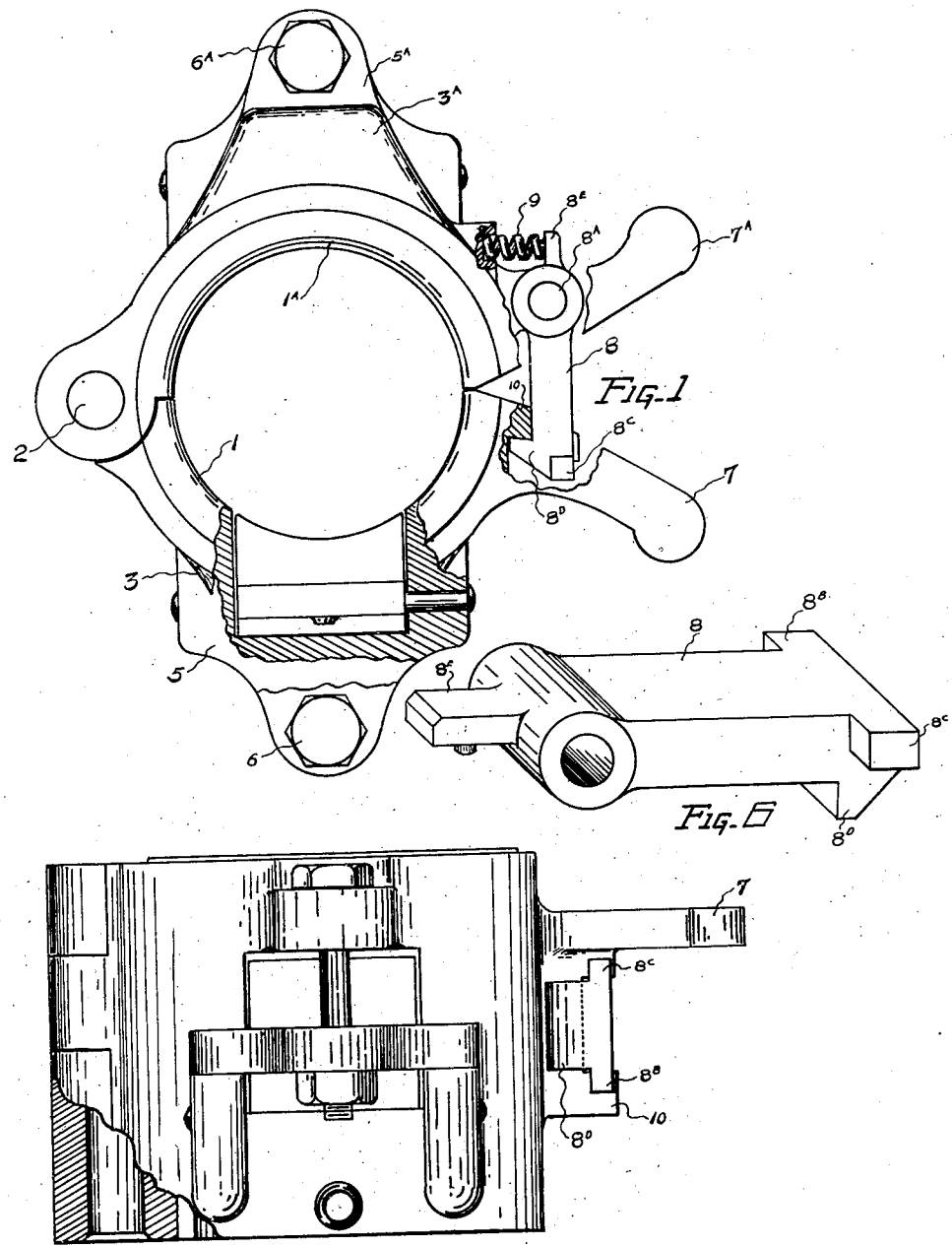

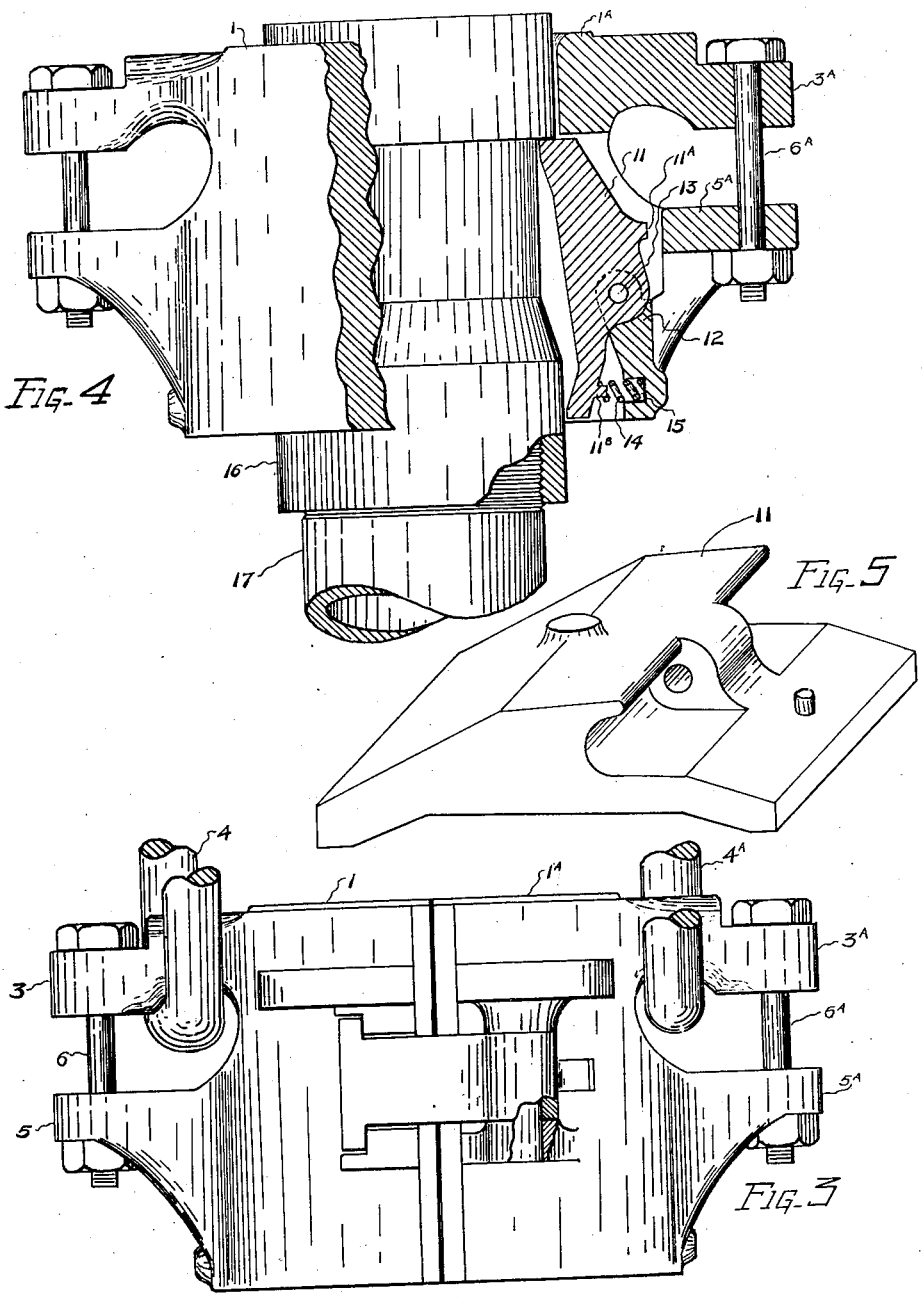

1,555,205

UNITED STATES PATENT OFFICE.

RICHARD D. HILL, OF WICHITA FALLS, TEXAS, ASSIGNOR OF ONE-THIRD TO JOHN M. SPELLMAN, OF DALLAS, TEXAS.

PIPE ELEVATOR.

Application filed March 15, 1924, Serial No. 699,526. Renewed July 27, 1925.

*To all whom it may concern:*

Be it known that I, RICHARD D. HILL, a citizen of the United States, residing at Wichita Falls, in the county of Wichita and State of Texas, have invented new and useful Improvements in Pipe Elevators; and I do declare the following to be a full, clear, and exact description of the same, such as will enable others skilled in the art to which it appertains to make and use the same.

My invention relates to pipe elevators and is especially adapted for use in connection with rotary well drilling. My object is to provide a pipe elevator that can be quickly attached and detached.

A further object is to provide a pipe elevator that can be attached to circumferentially grooved pipe tool joints while the lower portion of the tool joint is resting on slips.

Further objects and advantages will be apparent as the invention is more fully described.

With the foregoing in view, the invention resides in the novel subject matter hereinafter described and claimed, the description being supplemented by the accompanying drawings, wherein, Figure 1 is a top view partly sectioned.

Figure 2 is a side view partly sectioned.

Figure 3 is a side view.

Figure 4 is a partly sectioned side view showing the elevator attached to a pipe tool joint.

Figure 5 is a perspective view of the pipe supporting lug.

Figure 6 is a perspective view of the latch.

The invention comprises a pair of half-round members 1 and 1ª, pivoted together, as shown at 2. 3 and 3ª are side projections on the half-round members 1 and 1ª, for the purpose of attaching the carrying links 4 and 4ª. 5 and 5ª are side projections on the half-round members 1 and 1ª, disposed below the top side projections 3 and 3ª for the purpose of reinforcing the top side projections. 6 and 6ª are bolts connecting the top and lower side projections, each of the half-round members 1 and 1ª are provided with an aperture therethrough behind the lugs 11, which are hereinafter described, to enable dirt and mud to escape without effecting the operation of the lugs. 7 and 7ª are operating handles attached to the half-round members 1 and 1ª, as shown. 8 is a latch pivoted to the half-round member 1ª, as shown at 8ª. 8ᵇ and 8ᶜ are side projections on the hook end of the latch 8, to provide a safety in case the hook 8ᵈ should break. 8ᵉ is an arm attached to the pivoted end of the latch 8. 9 is a spring extending between the arm 9 and the half-round member 1ª, as shown, for the purpose of holding the latch 8 in a normally latching position. 10 is a projection on the half-round member 1, for association with the hook 8ᵈ of the latch 8. 11 is a pipe supporting lug pivoted to the bracket 12, as shown at 13, for the purpose of engaging the groove in the tool joint 16, as hereinafter described. 11ª is a boss on the supporting lug 11, in association with the projection 5ª to limit the pivotal movement of the supporting lug 11. 14 is a spring, one end thereof being disposed in the socket 15 and the other end thereof disposed over the boss 11ᵇ on the supporting lug 11 for the purpose of holding the lower portion of the lug 11 in an inwardly position and insure contact with the tool joint below the groove therein, thus forcing the top of the lug 11 into the said groove in the said tool joint. 16 illustrates the type of pipe tool joint which is specially adapted for use in connection with this elevator, the same being described and claimed in another application. 17 is a piece of pipe or drill stem threaded into the tool joint 16. The circumferential groove intermediate the ends of the tool joint 16 provides an offset therein to rest upon the top of the supporting lug 11. Figure 4 is partly sectioned to illustrate the position and function of one of the supporting lugs, and Figure 1 is a top view partly sectioned to show the other oppositely disposed supporting lug.

In operation, the elevator is removed from the tool joint by unhooking the latch 8, and spreading the half-round members 1 and 1ª. In placing the elevator on the tool joint, the top of the supporting lugs 11 must be below the top of the circumferential groove on the tool joint 16 to enable the top of the supporting lugs 11 to seat in the offset at the top of the said groove. It will be noted that the lower portion of the supporting lugs 11, when in contact with the lower portion of the tool joint forces the top of the supporting lugs 11 into the groove of the tool joint and as the elevator is raised the top of the lugs 11 seat in the offset portion of the tool joint at the top of the groove therein.

While it is believed from the foregoing description the nature and operation of the invention will be readily apparent, I desire to indicate clearly that I do not limit myself to the specific construction herein shown and described, and that such changes may be resorted to, when desired, as fall within the scope of what is herein claimed.

What I claim is:

1. A pipe elevator including a pair of hinged members having means thereon for automatically latching the free ends thereof around the shoulder of a tool joint; means on each of the hinged members at right angles to the hinge and latching means for attaching carrying links thereto, and spring controlled lugs disposed in the hinged members to engage beneath the shoulders of a tool joint when in locked relation.

2. A device of the character described comprising a pair of semi-circular members hinged to surround a tool joint, and means for locking the free ends of said members in such engagement; spring controlled lugs pivoted in each of said hinged members for engagement beneath the shoulder of a tool joint when the said members are in locked relationship, and means at right angles to said hinge and locking means for attaching carrying links thereto.

3. A pipe elevator comprising a pair of half round members hinged to surround a pipe tool joint and means for automatically latching the free ends of said members in said engagement, and spring controlled lugs pivoted in said half round members to engage beneath the shoulders of the tool joint when in locked position.

4. A pair of hinged members interiorally rounded and operating handles disposed on the free ends thereof, a hook disposed on the free ends of said hinged members so as to automatically latch when the free ends are placed together, and means for attaching carrying links to each of said hinged members, a lug pivoted in each of said hinged members so as to engage a circumferential groove in a pipe tool joint when the said hinged members are placed around the said tool joint, each of said hinged members having an exteriorally extending aperture therein behind each of said lugs, for the purpose set forth.

5. The device as defined in claim 4, said pivoted lugs comprising a substantially oblong member being horizontally pivoted transversely thereof to the central portion of each of said hinged members, and a spring centrally disposed between the lower end of said lugs and said hinged members so as to normally hold the lower portion of said lug inwardly and the upper portion of said lug outwardly when not engaged on a tool joint for the purpose set forth.

RICHARD D. HILL.